(12) United States Patent
Corte, Jr. et al.

(10) Patent No.: US 6,283,152 B1
(45) Date of Patent: Sep. 4, 2001

(54) MULTIPLE SLEEVE VALVE ASSEMBLY

(75) Inventors: Bobby J. Corte, Jr.; Kane J. Corte, both of Houma, LA (US)

(73) Assignee: COR-VAL, Inc., Houma, LA (US)

( * ) Notice: Subject to any disclaimer, the term of this patent is extended or adjusted under 35 U.S.C. 154(b) by 0 days.

(21) Appl. No.: 09/259,846

(22) Filed: Mar. 1, 1999

(51) Int. Cl.[7] .................................................... F16K 39/02
(52) U.S. Cl. .................. 137/614.11; 251/282; 137/625.3
(58) Field of Search .................... 137/614.11, 614.04, 137/614, 614.03, 625.3; 251/149.1, 282; 285/900

(56) References Cited

U.S. PATENT DOCUMENTS

| 4,240,609 | 12/1980 | Hahn et al. . | |
|---|---|---|---|
| 4,569,370 | * 2/1986 | Witt | 137/625.3 |
| 4,735,229 | 4/1988 | Lancaster . | |
| 4,905,733 | * 3/1990 | Carow | 137/614.04 |
| 4,971,099 | 11/1990 | Cyvas . | |
| 5,072,749 | * 12/1991 | Ligh | 137/116.5 |
| 5,076,324 | * 12/1991 | Herman et al. | 137/614.04 X |
| 5,086,808 | 2/1992 | Pettus . | |
| 5,277,225 | * 1/1994 | Smith | 251/149.1 X |

* cited by examiner

Primary Examiner—Kevin Lee
(74) Attorney, Agent, or Firm—E. Randall Smith

(57) ABSTRACT

A valve includes a valve body having an upstream bore, a downstream bore, a fluid flow chamber and a valve seat useful for sealing the fluid flow chamber from the downstream bore. The valve also includes a valve stem, a bonnet connected to the valve body and adapted to receive the valve stem therethrough, and a plurality of sealing assemblies operably connected to the valve stem.

41 Claims, 4 Drawing Sheets

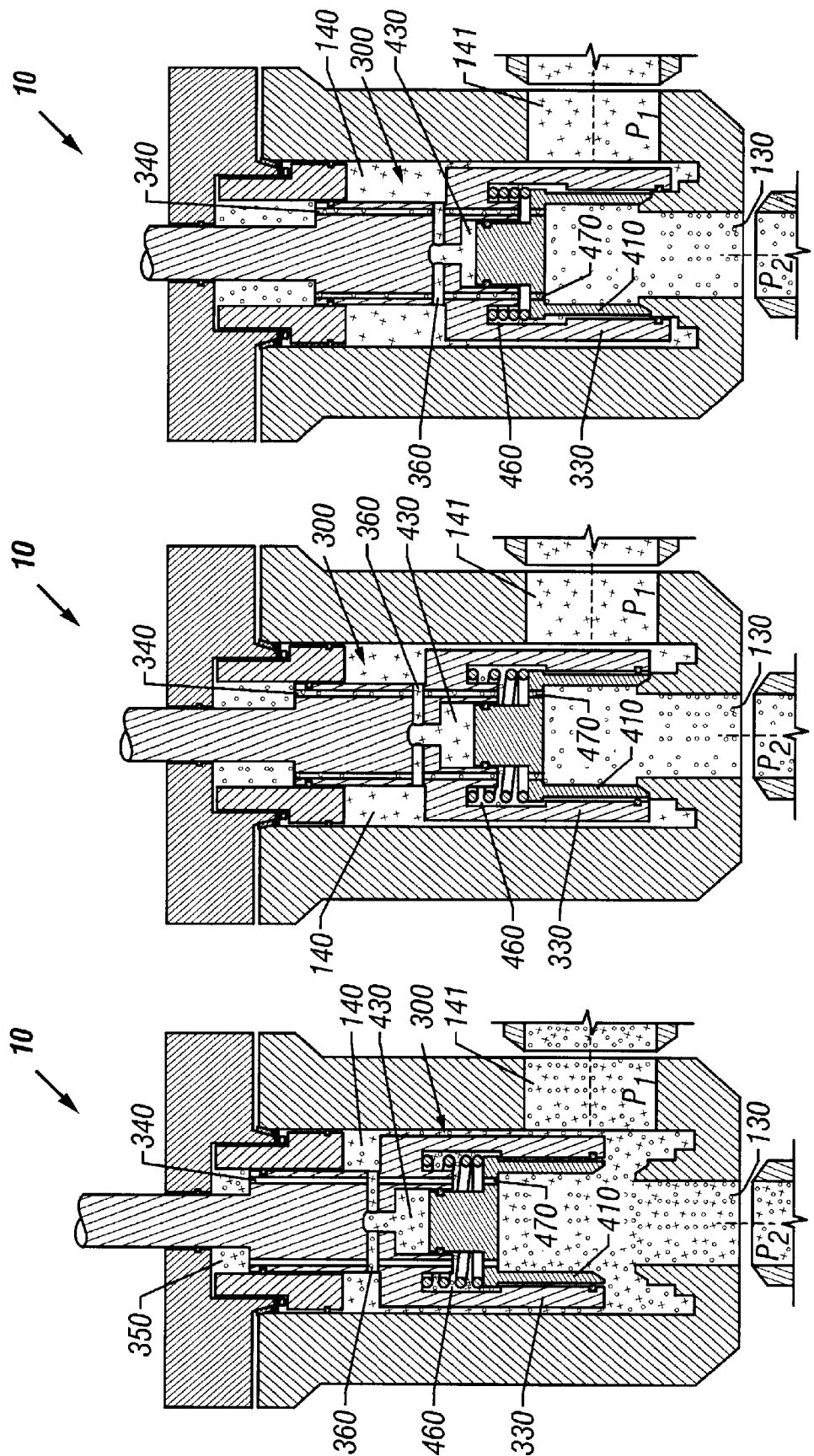

MULTIPLE SLEEVE VALVE ASSEMBLY

BACKGROUND OF THE INVENTION

1. Field of the Invention

The present invention relates generally to flow control devices. More particularly, the invention relates to a control valve having multiple seals in a single valve trim. In a particular embodiment, the invention relates to a choke valve having multiple balanced sealing sleeves contained within a single valve trim.

2. Background of the Related Art

Flow control devices are useful for modifying the flow rate in flow channels, conduits or systems. For example, flow control choke valves are useful in fluid pipelines, such as high pressure oil and gas production pipelines where high pressure differentials may exist between the fluid pressure in the upstream and downstream pipelines, between which the valve is disposed. For example, the upstream fluid pressure in a high pressure oil and gas production pipeline may be on the order of 5000 pounds per square inch and the downstream fluid pressure ranging from 0 to 5000 pounds per square inch. Thus, flow control devices may be designed to be capable of operating in high pressure environments.

Flow control devices typically include a reciprocating valve stem threadably or otherwise connected to a valve body. The valve stem carries or is connected to a closure member or a sealing assembly. As it reciprocates, the typical valve stem is capable of engaging and disengaging the closure member with a valve seat (or around an orifice). Fluid pressure within the flow control device may, however, exert undesirable pressure forces on the internal components of the flow control device that are in contact with the flowing fluid, mixture or other media (the valve "trim") and which are associated or connected with the valve stem. This can make reciprocation or movement of the valve stem and thus operation of the flow control device difficult or impossible.

Balanced flow control devices have been contemplated to balance pressure forces on internal components of the flow control device in an effort to reduce or eliminate the resultant pressure forces on the valve stem. To achieve balanced valve trim, balance conduits extending at least partially through one or more internal valve components may be provided. For example, one or more balance conduits may be disposed in the closure member of a fluid control valve. In such example, fluid and thus fluid pressure from the downstream bore can be communicated through the balance conduit(s) to opposing sides or surfaces of the closure member, enabling the closure member to be balanced.

Existing balanced flow control devices include a single balanced closure member or sealing assembly with a single seal in each valve trim. However, for a variety of reasons, it is believed that it would be beneficial to provide one or more additional seals within the same valve trim as that of the single seal. For example, this may be used to provide resilient secondary sealing in the event that the primary non-resilient seal member should fail. Existing balanced control valves are not believed to provide multiple seals or seal members within a single valve trim. In addition, existing balanced control valves do not provide for multiple balanced sealing assemblies.

Accordingly, theres is a need for a flow control valve with multiple sealing assemblies, or seals, within a single valve trim. Ideally, at least in some instances, each of the seals, or multiple sealing assemblies, of such a flow control valve could be balanced. Further, especially well received would be a valve having such feature(s) and which is useful as a choke valve.

SUMMARY OF THE INVENTION

In a particular aspect, a balanced control valve includes: a choke body having an upstream bore, a downstream bore, a fluid flow chamber, and a valve seat for sealing the fluid flow chamber from the downstream bore; a bonnet connected to the choke body and adapted to receive a valve stem therethrough; and a valve stem disposed through the bonnet and having a plurality of balanced sealing assemblies operably connected thereto. In such an embodiment, the plurality of balanced sealing assemblies may comprise an inner sealing assembly and an outer sealing assembly. The inner sealing assembly may have a balance conduit passing therethrough for communicating downstream fluid pressure with the balance chamber of the inner sealing assembly, and the inner sealing assembly may include an inner sealing sleeve with a sealing member for sealing engagement with an inner sealing surface of the valve seat of the choke body.

The sealing member of the inner sealing sleeve may be a non-resilient sealing surface, which could be a carbide tip. Further, the outer sealing assembly may have a balance conduit passing therethrough for communicating downstream fluid pressure with the balance chamber of the outer sealing assembly, and the outer sealing assembly may include an outer sealing sleeve with a sealing member for sealing engagement with an outer sealing surface of the valve seat of the choke body. The sealing member of the outer sealing sleeve may be a resilient seal ring, which could be an o-ring.

In another aspect, a control valve includes a plurality of sealing assemblies in a single choke trim. In such an embodiment, each of the plurality of sealing assemblies may be a balanced sealing assembly. The plurality of sealing assemblies may comprise: an outer sealing assembly having a sealing member adapted for sealing engagement with an outer sealing surface of a valve seat associated with the choke valve, and also having a balance conduit therethrough for communicating downstream fluid pressure to a balance chamber associated with the outer sealing assembly; and an inner sealing asssembly in sliding engagement with the outer sealing assembly, and having a sealing member adapted for sealing engagement with an inner sealing surface of the valve seat, and also having a balance conduit therethrough for communicating downstream fluid pressure to a balance chamber associated with the inner sealing assembly.

The outer sealing assembly may include a fluid flow conduit therethrough for communicating fluid pressure from a fluid flow chamber within the choke valve to a chamber within the outer sealing assembly associated with the inner sealing assembly. Further, the sealing member of the outer sealing assembly may be a resilient sealing member, and the sealing member of the inner sealing assembly may be a non-resilient sealing member. The plurality of sealing assemblies may be selectively reciprocated between a first, fully open position; a second, initially engaged position; and a third, fully engaged position. Further, in the fully open position, neither the inner sealing assembly nor the outer sealing assembly is sealingly engaged with the valve seal. In the initially engaged position, the inner sealing assembly is sealingly engaged with the valve seat but the outer sealing assembly may be sealingly engaged with the valve seat. In the fully engaged position, the inner and outer sealing assemblies may be sealingly engaged with the valve seat.

BRIEF DESCRIPTION OF THE DRAWINGS

So that the manner in which one or more of the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a cross-sectional view of the control valve of FIG. 1 shown in a first, or fully open, position in accordance with an embodiment of the present invention.

FIG. 3 is a cross-sectional view of the control valve of FIG. 1 shown in a second, or initially engaged, sealing position in accordance with an embodiment of the present invention.

FIG. 4 is a cross-sectional view of the control valve of FIG. 1 shown in a third, or fully engaged, sealing position in accordance with an embodiment of the present invention.

DETAILED DESCRIPTION OF THE PREFERRED EMBODIMENT

Figure 1:
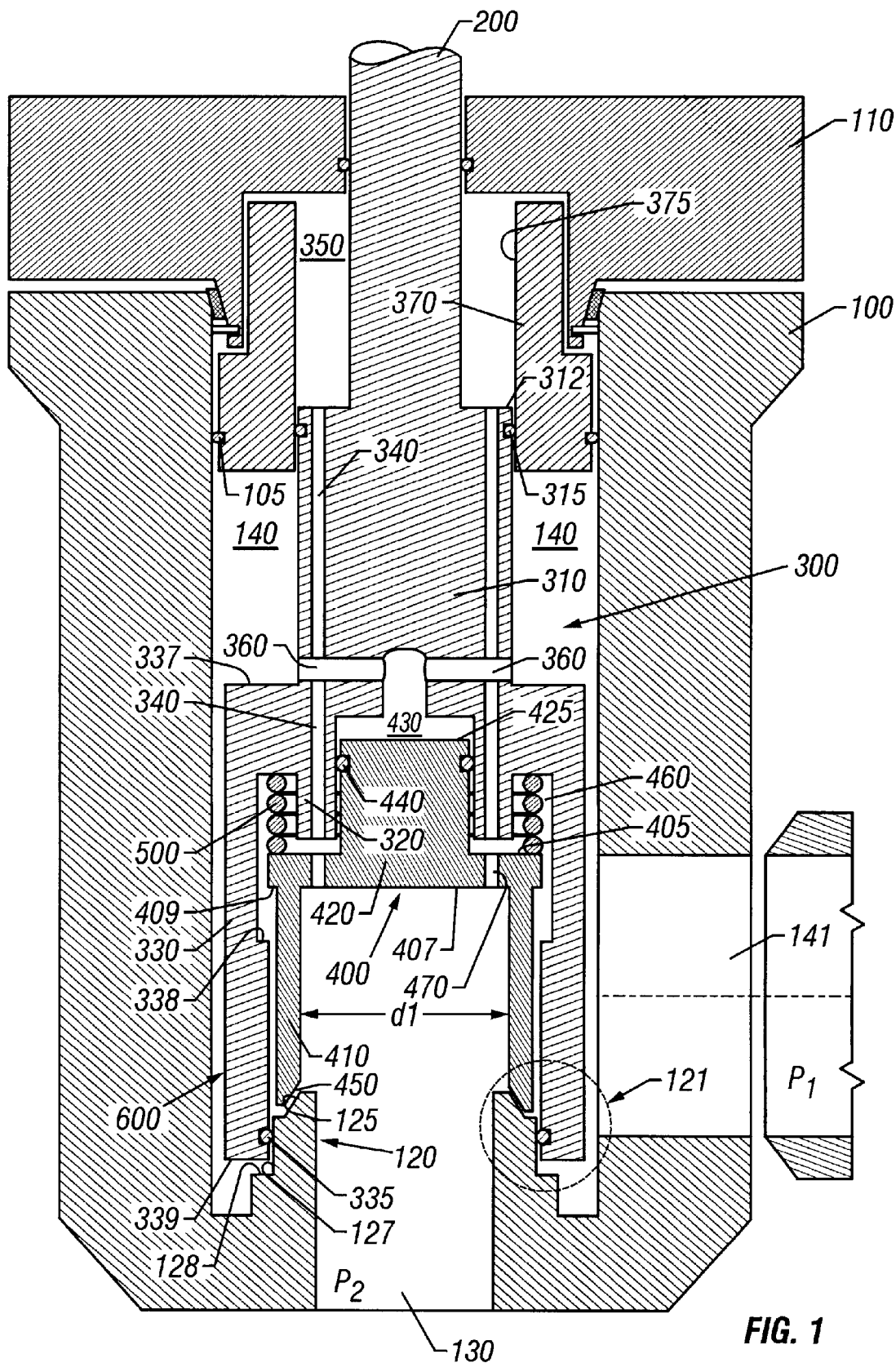
FIG. 1 is a cross-sectional view of a control valve in accordance with an embodiment of the present invention.

Referring to FIG. 1, in accordance with one aspect of the invention, a balanced, multiple sleeve, control valve 10 is provided which in the particular embodiment shown is a dual sleeve control choke valve 10. The dual sleeve control choke valve 10 shown in FIG. 1 generally includes a choke valve body 100 and bonnet 110, having a valve stem 200 disposed through the bonnet 110 and connected to or integral with a dual sleeve sealing assembly 300. The dual sleeve sealing assembly 300 preferably includes an outer sleeve piston 310 connected to or integral with the valve stem 200, and further includes an inner sleeve cylinder 320 connected to or integral with the outer sleeve piston 310, which defines an inner sleeve cylinder chamber 430. An outer sealing sleeve 330 is preferably connected to or integral with the outer sleeve piston 310 and preferably extends from the outer sleeve piston 310 in a direction generally towards a valve seat 120 connected to or integral with the choke body 100. It should be noted that the valve seat 120 may be integral with the choke body 100, or it may be threadably or otherwise connected to the choke body 100.

Still referring to the embodiment of FIG. 1, the dual sleeve sealing assembly 300 preferably further includes an inner sleeve assembly 400, which may include an inner sealing sleeve 410 connected to or integral with an inner sleeve piston 420. The inner sleeve piston 420 is preferably sized to reciprocate within the inner sleeve cylinder chamber 430 defined by the inner sleeve cylinder 320 and includes a resilient sealing member 440 partially or completely to seal the annulus between the inner sleeve piston 420 and the inner sleeve cylinder 320 as it reciprocates therewithin. The inner sealing sleeve 410 preferably extends from the inner sleeve piston 420 in a direction generally towards the valve seat 120 of the choke body 100 and has a sealing surface 450 on a distal end thereof, which is adapted to be sealingly engaged with an inner sealing surface 125 of the valve seat 120. A first balance chamber 460 is defined between the outer sealing sleeve 330 and the inner sleeve assembly 400, and is separated from the inner sleeve cylinder chamber 430 by the resilient sealing member 440 of the inner sleeve piston 420.

Still referring to the embodiment of FIG. 1, a first balance conduit 470 is provided through the inner sleeve piston 420 or inner sealing sleeve 410 to provide fluid communication between the downstream bore 130 and the first balance chamber 460. A second balance conduit 340 is provided through the inner sleeve cylinder 320 and the outer sleeve piston 310 to provide fluid communication between the first balance chamber 460 and a second balance chamber 350, which also provides fluid communication between the downstream bore 130 and the second balance chamber 350. A flow chamber 140 is defined generally within the choke body 100 and a flow conduit 360 is provided through the outer sleeve piston 310 to provide fluid communication between the flow chamber 140 and the inner sleeve cylinder chamber 430.

Yet still referring to the embodiment of FIG. 1, an outer sleeve cylinder 370 is provided within the choke body 100 proximate to the bonnet 110 and having a bore 375 therethrough within which the stem 200 and/or outer sleeve piston 310 are allowed to reciprocate. Seals 315 and 105 are shown on opposite sides of the outer sleeve cylinder 370 and may assist in defining the second balance chamber 350 and/or separating the second balance chamber 350 from the flow chamber 140. It should be noted that the outer sleeve cylinder 370 may also be integral with or otherwise connected to the choke body 100 or bonnet 110 so long as the second balance chamber 350 defined thereby is separated from the flow chamber 140 except as may be provided through second balance conduit 340 such as described further hereafter.

The dual sleeve sealing assembly 300 of the embodiment of FIG. 1 provides a plurality of distinct sealing sleeves 410, 330, which may provide a plurality of sealing members or seal types to be employed within a single choke valve trim. In the assembly 300 shown in FIGS. 2–4, the inner sealing sleeve 410 is preferably a generally non-resilient sealing sleeve 410, which preferably may include a carbide sealing surface 450 or a sealing surface 450 of other materials such as, for example, PEEK or TEFLON for engagement with an inner sealing surface 125 of the valve seat 120 to provide, for example, desired resistance to corrosive or other harmful elements of the fluid being controlled.

Figure 6:
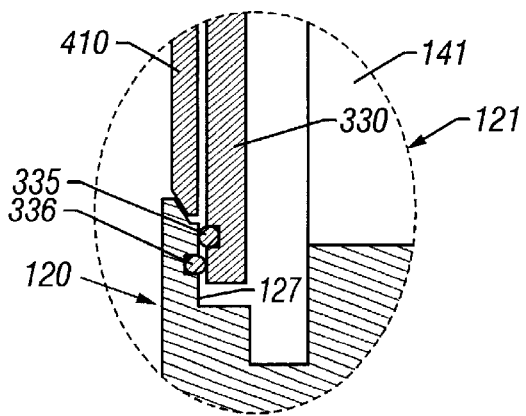
FIG. 6 is a cross-sectional view of an embodiment of a valve seat in accordance with an embodiment of the present invention having a secondary, or backup, resilient sealing member disposed in connection with the valve seat.

In the embodiment shown in FIG. 1, the outer sealing sleeve 330 is preferably a generally resilient sealing sleeve 330, which may preferably include a resilient soft seal member 335 on an inner surface thereof for sealing engagement with the outer sealing surface 127 of the valve seat 120. If desired, the assembly 300 with sleeve 330 and resilient soft seal member 335 can be designed so that the seal 335 is able to provide positive shutoff capabilities and/or to further provide a secondary seal in the event of inner sleeve, or primary seal, failure. As shown for example in FIG. 6, a backup resilient soft seal member 336 may also be provided on the outer sealing surface 127 of the valve seat 120 to provide sealing between the outer sealing sleeve 330 and the valve seat 120 in the event of failure of the primary resilient soft seal member 335. This may occur, for example, if the primary seal 335 passes between the inner sealing sleeve 410 and the valve seat 120 through extrusion or other failure mechanisms, the backup seal 336 assisting in maintaining a positive standoff.

Figure 7:
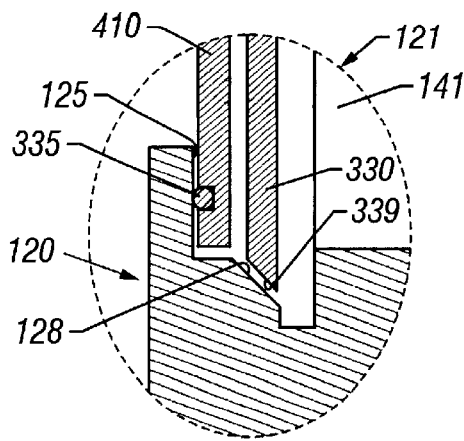
FIG. 7 is a partial cross-sectional view of another embodiment of the sealing portion of the control valve of the present invention.
Figure 8A:
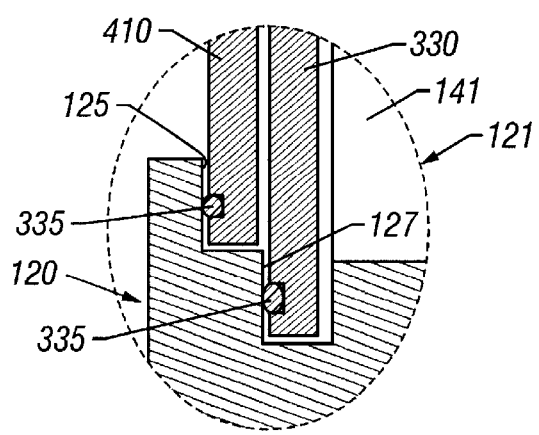
FIG. 8A is a partial cross-sectional view of another embodiment of the sealing portion of the control valve of the present invention having resilient sealing members on inner surfaces of the inner and outer sealing sleeves.
Figure 8B:
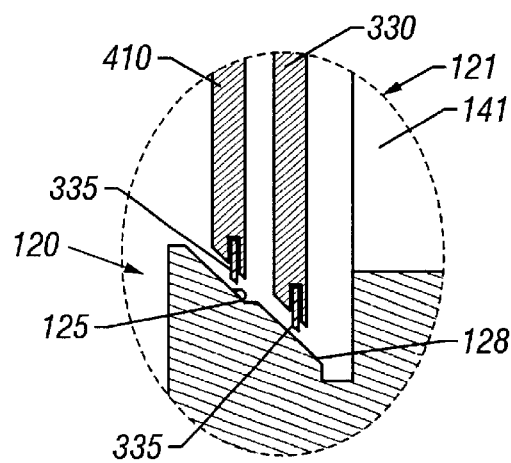
FIG. 8B is a partial cross-sectional view of another embodiment of the sealing portion of the control valve of the present invention having resilient sealing members on distal surfaces of the inner and outer sealing sleeves.
Figure 9:
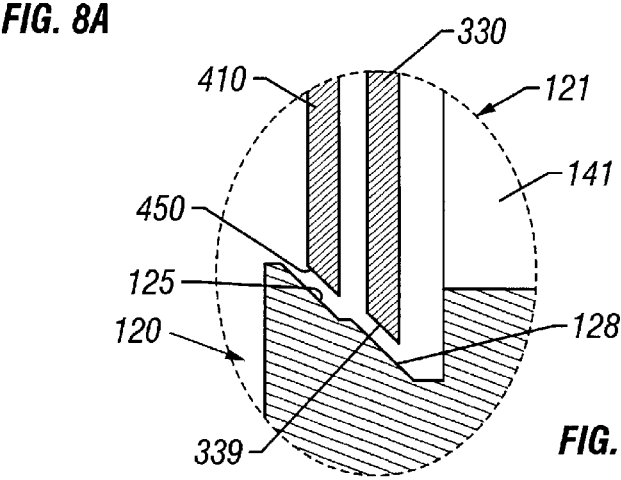
FIG. 9 is a partial cross-sectional view of another embodiment of the sealing portion of the control valve of the present invention.

In a particular embodiment, it may be desirable to maintain a non-resilient seal in connection with both the inner and outer sealing sleeves 410, 330. In such an embodiment, such as shown, for example, in FIG. 7 the distal surface 339 of outer sealing sleeve 330 may be designed to provide a sealing surface 339 for sealing of the outer sealing sleeve 330 against shoulder, or sealing surface 128 of the valve seat 120. FIGS. 7–9 illustrate some examples of embodiments of the sealing portion 121, which may be desirable in certain applications. In the embodiment shown in FIG. 7, inner sealing sleeve 410 may include resilient sealing member 335 for sealing engagement with inner sealing surface 125 of valve seat 120 and outer sealing sleeve 330 may include a tapered sealing surface 339 for sealing engagement with shoulder, or sealing surface 128 of valve seat 120. In the embodiment shown in FIG. 8A, resilient sealing members 335 may be provided in connection with both inner and outer sealing sleeves 410,330 for sealing engagement with inner sealing surface 125 and sealing surface 128 of valve seat 120. In the embodiment shown in FIG. 8B, resilient sealing members 335 are disposed in the distal ends of inner and outer sealing sleeves 410, 330 to provide a combination hard and soft seal for the inner and outer sealing sleeves 410, 330. Any of the soft seal embodiments may utilize such a hard/soft seal combination by providing the resilient sealing member 335 in connection with the distal end of the desired sealing sleeve. FIG. 9 further shows an embodiment of sealing portion 121 having non-resilient sealing surfaces 450 and 339 provided in connection with both the inner sealing sleeve 410 and outer sealing sleeve 330, respectively.

An example of operation of the preferred embodiment will now be described in the following sections entitled FULLY OPEN POSITION, PRIMARY SEATING POSITION and SECONDARY SEATING POSITION.

Fully Open Position

FIG. 2 shows the embodiment of a dual sleeve sealing assembly 300 of FIG. 1 in a first, fully open, sealing position. In the fully open sealing position shown in FIG. 2, upstream fluid is allowed to flow through the upstream bore 141 into the flow chamber 140 and through the downstream bore 130. In the embodiment shown, fluid is communicated through the flow conduit 360 and the first and second balance conduits 470, 340, respectively, to allow the mixed upstream and downstream fluid to flow throughout the sealing assembly 300, and also the first and second balance chambers 460, 350 and the inner sleeve cylinder chamber 430.

Primary Seating Position

With reference now to FIGS. 1 and 3, FIG. 3 shows the dual sleeve sealing assembly 300 of the embodiment of FIG. 1 in a second, initially engaged, sealing position in which the sealing surface 450 of the inner sealing sleeve 410 is sealingly engaged with the inner sealing surface 125 of the valve seat 120. As the inner sealing sleeve 410 is engaged with the valve seat 120, upstream fluid flow is generally sealed off from the downstream bore 130. In such a position, the first balance conduit 470 maintains fluid communication between the downstream bore 130 and both the first balance chamber 460 and the second balance chamber 350. In such a position, the flow conduit 360 maintains fluid communication between the upstream bore 141, the flow chamber 140, and the inner sleeve cylinder chamber 430.

In accordance with this example of operation of the illustrated embodiment, upstream fluid pressure represented by P1 from upstream fluid represented by element 'x' is provided in inner sleeve cylinder chamber 430 and exerts pressure forces against the cylinder surface 425 of the inner sleeve piston 420. Downstream fluid pressure represented by P2 from downstream fluid represented by the element 'o' is provided in the first balance chamber 460 and exerts pressure forces against the chamber surface 405 of the inner sleeve assembly 400. Downstream fluid pressure P2 is provided in the downstream bore 130 and exerts pressure forces against the downstream bore surface 407 of the inner sleeve assembly 400. Preferably, the sealing surface 450 of the inner sealing sleeve 410 contacts the inner sealing surface 125 of the valve seat 120 at a position generally co-extensive with the inner diameter d1 (FIG. 5) of the inner sealing sleeve 410. Accordingly, portions of the sealing surface 450 of the inner sleeve assembly outboard of the contact position are in fluid communication with the fluid flow chamber 140 and are, thereby, subject to fluid pressure forces from the upstream fluid pressure P1 contained therein. Also in accordance with this particular embodiment, downstream fluid pressure P2 is also provided through the second balance conduit 340 to the second balance chamber 350 and exerts pressure forces against the balance chamber surfaces 312 of the outer sleeve piston 310 and against the stem 200 in an opposite direction, while upstream fluid pressure P1 in the flow chamber 140 exerts pressure forces against the flow chamber surfaces 337 of the outer sealing sleeve 330.

The diameters of the various elements of the inner sleeve assembly 400 and the relative surface areas thereof in communication with the upstream and downstream fluid of the embodiment of FIGS. 1 and 3 are preferably sized to effectively and generally balance the pressure forces exerted thereon to minimize or prevent undesirable pressure forces against the inner sleeve assembly 400 in either a direction generally toward or away from the valve seat 120 to minimize or prevent undue forces against the valve stem 200. It should be noted that some resultant pressure force may be present. It should be understood that the term "balanced", as used herein, generally includes slightly out of balanced choke trim so long as balancing ports and chambers are provided for a particular element to effect a degree of balance between opposing forces of that element even if some resulting force remains either upward or downward on that element.

In accordance with this particular embodiment, a spring 500 or other biasing member 500 may be provided to initially bias the inner sealing sleeve 410 in a direction generally towards the valve seat 120 and to preferably initially bias outer sleeve assembly 600 in the dis-engaged position shown in FIG. 3. In such an embodiment, a flange 409 may also be provided in connection with the inner sleeve assembly 410 to mate with a corresponding landing, or shoulder 338 provided on an inner surface of the outer sealing sleeve 330 to retain the inner sleeve assembly 400 within the sealing assembly 300.

Also in accordance with this particular embodiment the diameters of the various elements of the outer sealing sleeve assembly 600 and the relative surface areas thereof in communication with the upstream and downstream fluid are preferably sized to effectively and generally balance the pressure forces exerted thereon to minimize or prevent undesirable pressure forces against the outer sealing sleeve assembly 600 in either a direction generally toward or away from the valve seat 120 to minimize or prevent unde forces against the stem 200.

Figure 5:
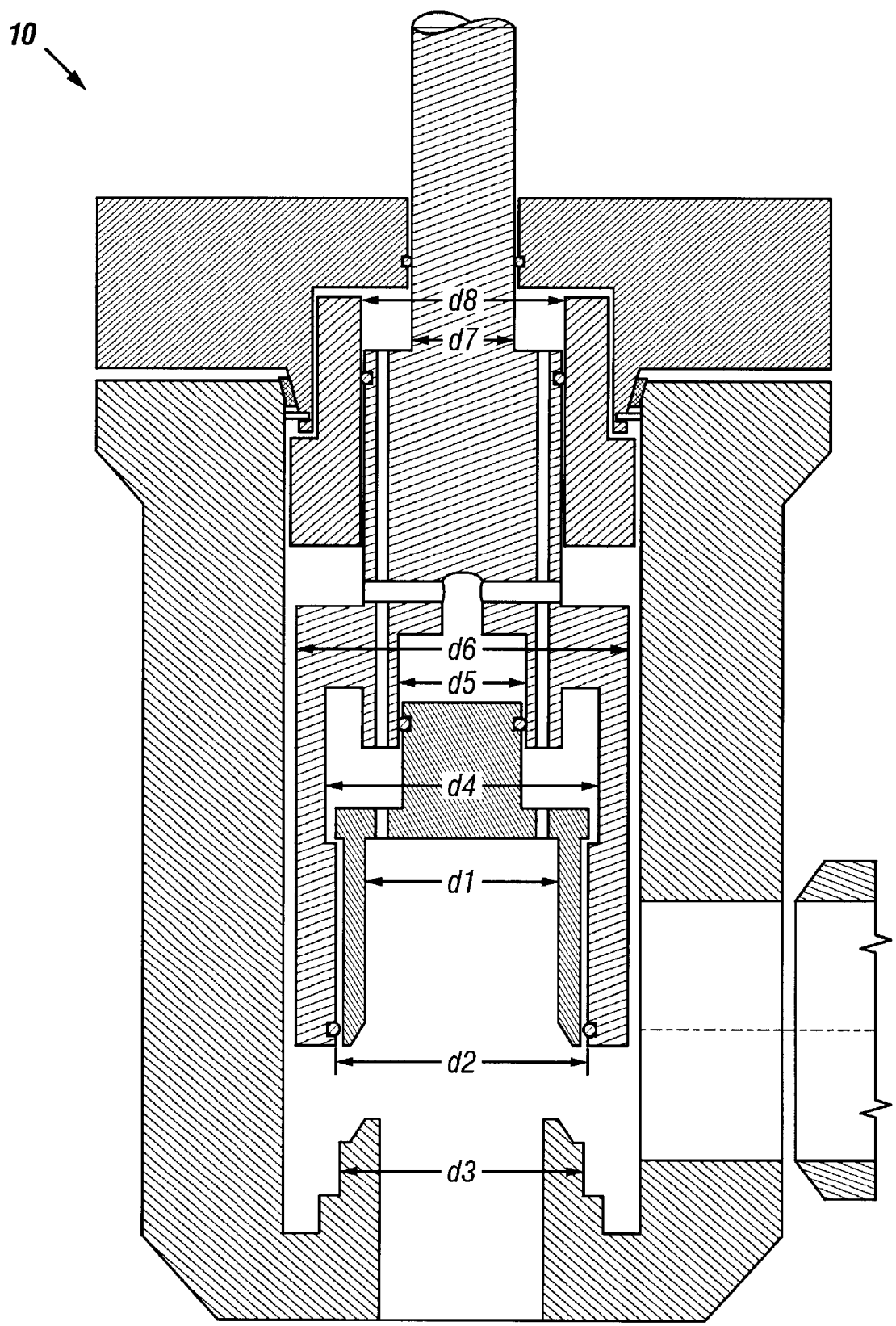
FIG. 5 is a cross-sectional view of the control valve of FIGS. 1–4, showing various exemplary dimensions.

Still with reference to the embodiment FIGS. 1 and 3 and also with reference to the dimensions shown in FIG. 5, upstream fluid flow is initially sealed off from the downstream bore 130 by the inner sealing sleeve 410 against the inner sealing surface 125 of the valve seat 120 prior to activating the secondary seal of outer sealing sleeve 330. In the second, initially engaged, sealing position shown in FIG. 3, upstream pressure P1 is present in the upstream bore 141, the inner sleeve cylinder chamber 430, and the flow chamber 140 including the portion of flow chamber 140 in fluid contact with the sealing surface 125 of inner sealing sleeve 410. Upstream pressure P1 is, in the illustrated emodiment, acting in an upward direction (i.e., towards the stem 200 and away from the valve seat 120) on the following surface areas: (1) the surface area defined by outside diameter d8 of the outer sleeve piston 310; and (2) the surface area defined by the diameter d5 of the inner sleeve cylinder chamber 430, and in a downward direction (i.e., towards the valve seat 120 and away from the stem 200) on the following surface areas: (1) the surface area defined by the diameter d5 of the inner sleeve cylinder chamber 430; and (2) the surface area defined by the diameter d1 of the inner sealing sleeve 410.

In a particular example, if the outer sleeve piston 310 has an outside diameter d8 of 2.5 inches, the associated effective area having pressure forces acting in an upward direction would be 4.906 square inches. There would be no associated effective area having pressure forces acting in a downward direction. Similarly, if the inner sleeve cylinder chamber 430 has a diameter d5 of 1.66 inches, the associated effective area having pressure forces acting in an upward direction would be 2.163 square inches. The associated effective area having pressure forces acting in a downward direction would also be 2.163 square inches. Similarly, if the inner sealing sleeve 410 has an inside diameter d1 of 2.5 inches, the associated effective area having pressure forces acting in a downward direction would be 4.906 square inches. There would be no associated effective area having pressure forces acting in either an upward or downward direction. There would, therefore, be no resultant force acting in an upward direction against the valve stem 200 associated with upstream fluid pressure force P1.

Still with reference to the embodiment of FIGS. 1 and 3 and also with reference to the dimensions shown in FIG. 5, downstream pressure P2 is present in the second balance chamber 350, the first balance chamber 460, and the downstream bore 130. Downstream pressure P2 is, in the illustrated embodiment, acting in an upward direction (i.e., towards the stem 200 and away from the valve seat 120) on the following surface areas: (1) the surface area defined by the diameter d7 of the valve stem 200; and (2) the surface area defined by the inside diameter d1 of the inner sealing sleeve 410, and in a downward direction (i.e., towards the valve seat 120 and away from the stem 200) only on the outside diameter d8 of the outer sleeve piston 310.

In a particular example, if the stem 200 has a diameter d7 of 1.375 inches, the associated effective area having pressure forces acting in an upward direction would be 1.484 square inches. There would be no associated effective area having pressure forces acting in a downward direction. If the outer sleeve piston 310 has an outside diameter d8 of 2.5 inches, the associated effective area having pressure forces acting in a downward direction would be 4.906 inches. Similarly, if the inner sealing sleeve 410 has an inside diameter d1 of 2.5 inches, the associated effective area having pressure forces acting in an upward direction would be 4.906 square inches. There would be no associated effective area having pressure forces acting in a downward direction. There would, therefore, be a resultant force acting in an upward direction against the valve stem 200 associated with downstream fluid pressure P2. Accordingly, in the second, or initially engaged, sealing position shown in FIG. 3, there would be a resultant upward force against the valve stem 200 in an upward direction of approximately 1.484 square inches times the downstream pressure force P2. If, for example, upstream fluid pressure P1 is 5,000 psi, and downstream fluid pressure P2 is 0, there would be no force acting against the stem 200. If the upstream fluid pressure P1 is 5,000 psi and the downstream fluid pressure P2 is 100 psi in this particular example, then the force acting against the stem 200 would be approximately equal to only 148.4 pounds in an upward direction.

Secondary Seating Position

Referring now to FIGS. 1 and 4, continued downward movement of the illustrated exemplary valve stem 200 toward the valve seat 120 will compress the spring 500 between the inner sleeve piston 420 and the inner sleeve cylinder 320 and allow further downward movement of the outer sealing sleeve 330 to permit engagement of the resilient sealing member 335 between the outer sealing sleeve 330 and the outer sealing surface 127 of the valve seat 120. FIG. 4 shows the illustrated exemplary dual sleeve sealing assembly 300 in a third, fully engaged, sealing position in which the sealing surface, or sealing member 335 of the outer sealing sleeve 330 is sealingly engaged with the outer sealing surface 127 of the valve seat 120. As the illustrated exemplary outer sealing sleeve 330 is lowered beyond the end of the inner sealing sleeve 410 and is sealingly engaged with the valve seat 120, upstream fluid pressure P1 is isolated from the sealing surface 125 of the inner sealing sleeve 410. Instead, fluid is permitted to flow from the first balance chamber 460 in the annulus between the inner sealing sleeve 410 and the outer sealing sleeve 330 to provide fluid communication of the downstream fluid pressure P2 in connection with the sealing surface 125 of the inner sealing sleeve 410.

In this exemplary third position of FIG. 4, upstream fluid flow is further sealed off from the downstream bore 130 by the secondary seal, or resilient sealing member 335 of the outer sealing sleeve 330 in addition to the primary seal of the sealing surface 450 of the inner sealing sleeve 410. In such a position, the first balance conduit 470 maintains fluid communication between the downstream bore 130 and both the first balance chamber 460 and the second balance chamber 350. The flow conduit 360 still maintains fluid communication between the upstream bore 141, the flow chamber 140, and the inner sleeve cylinder chamber 430.

In accordance with this particular example, upstream fluid pressure P1 is provided within inner sleeve cylinder chamber 430 and exerts pressure forces against the cylinder surface 425 of the inner sleeve piston 420 Downstream fluid pressure P2 is provided in the first balance chamber 460 and exerts pressure forces against the chamber surface 405 of the inner sleeve assembly 400 Downstream fluid pressure is provided in the downstream bore 130 and exerts pressure forces against the downstream bore surfaces 407 of the inner sleeve assembly 400. The diameters of the various elements of the exemplary outer sealing sleeve assembly 600 and the relative surface areas thereof in communication with the upstream and downstream fluid are preferably sized to effectively and generally balance the pressure forces exerted thereon in the third position to minimize or prevent undesirable pressure forces against the outer sealing sleeve assembly 600 in either a direction generally toward or away from the valve seat 120 to minimize or prevent undesirable forces against the stem 200.

In accordance with this particular example with reference to FIGS. 1 and 4 and also with reference to the dimensions shown in FIG. 5, upstream fluid flow is sealed off from the downstream bore 130 by the inner sealing sleeve 410 against the inner sealing surface 125 of the valve seat 120. The inner sealing surface 450 is also sealed off from the upstream fluid flow by the resilient seal 335 of the outer sealing sleeve 330. In the exemplary third, fully engaged, sealing position shown in FIG. 4, upstream pressure P1 is present in the upstream bore 141, the flow chamber 140, and the inner sleeve cylinder chamber 430. Unlike that of the second position described hereinabove and illustrated in FIG. 3, however, upstream pressure P1 is not in fluid communication with the sealing surface 450 of inner sealing sleeve 410 in accordance with this example of operation. Upstream pressure P1 is acting in an upward direction (i.e., towards the stem 200 and away from the valve seat 120) on the following surface areas: (1) the surface area defined by outside diameter d8 of the outer sleeve piston 310; and (2) the surface area defined by the diameter d5 of the inner sleeve cylinder chamber 430, and in a downward direction (i.e., towards the valve seat 120 and away from the stem 200) only on the surface area defined by the inside diameter d2 of the outer sealing sleeve 330.

In a particular example, if the outer sleeve piston 310 has an outside diameter d8 of 2.5 inches, the associated effective area having pressure forces acting in an upward direction would be 4.906 square inches. There would be no associated effective area having pressure forces acting in a downward direction. If the inner sleeve cylinder chamber 430 has a diameter d5 of 1.66 inches, the associated effective area having pressure forces acting in an upward direction would be 2.163 square inches. The associated effective area having pressure forces acting in a downward direction would also be 2.163 square inches. If the outer sealing sleeve 330 has an inside diameter d2 of 3.0 inches, the associated effective area having pressure forces acting in a downward direction would be 7.065 square inches. There would be no associated effective area having pressure forces acting in an upward direction. There would, in accordance with this example, be a resultant force acting in an upward direction against the valve stem 200 associated with upstream fluid pressure force P1 approximately equal to 0.004 square inches times the upstream fluid pressure force P1.

In accordance with this particular example of operation with reference to FIGS. 1 and 4 and also with reference to the dimensions shown in FIG. 5, downstream pressure P2 is present in the second balance chamber 350, the first balance chamber 460, the downstream bore 130, and also in fluid communication with the sealing surface 450 of the inner sealing sleeve 410. Downstream pressure P2 is, in this example, acting in an upward direction (i.e., towards the stem 200 and away from the valve seat 120) on the following surface areas: (1) the surface area defined by the diameter d7 of the valve stem 200; and (2) the surface area defined by the inside diameter d2 of the outer sealing sleeve 330, and in a downward direction (i.e., towards the valve seat 120 and away from the stem 200) only on the outside diameter d8 of the outer sleeve piston 310.

In a particular example, if the stem 200 has a diameter d7 of 1.375 inches, the associated effective area having pressure forces acting in an upward direction would be 1.484 square inches. There would be no associated effective area having pressure forces acting in a downward direction. If the outer sleeve piston 310 has an outside diameter d8 of 2.5 inches, the associated effective area having pressure forces acting in a downward direction would be 4.906 inches. If the outer sealing sleeve 330 has an inside diameter d2 of 3.0 inches, the associated effective area having pressure forces acting in an upward direction would be 7.065 square inches. There would be no associated effective area having pressure forces acting in a downward direction. There would, in this example, be a resultant force acting in an upward direction against the valve stem 200 associated with downstream fluid pressure P2 approximately equal to 3.643 square inches times the downstream fluid pressure P2. In the exemplary third, or fully engaged, sealing position shown in FIG. 4, there would be a minimal resultant upward force against the valve stem 200 in an upward direction of approximately 0.004 square inches times the upstream pressure force P1, and a resultant downward force against the valve stem 200 of approximately 3.643 times the downstream pressure force P2. If, for example, upstream fluid pressure P1 is 5,000 psi, and downstream fluid pressure P2 is 0, there would be a force acting against the stem 200 of only 20 pounds. If the upstream fluid pressure P1 is 5,000 psi and the downstream fluid pressure P2 is 100 psi, then the force acting against the stem 200 would be approximately equal to 384.3 pounds.

It should be understood that the above-described embodiments, operation and features are exemplary only. Because many possible embodiments may be made of the present invention without departing from the scope thereof, it is to be understood that all matter herein set forth or shown in the accompanying drawings is to be interpreted as illustrative and not limiting. While preferred embodiments of the invention have been shown and described, modifications thereof can be made by one of ordinary skill in the art without departing from the spirit or teachings of this invention and the scope of the appended claims. Many variations and modifications of the apparatus and methods of the present invention are possible and within the scope of the present invention and the appended claims. For a few examples, any suitable dimensions could be selected to provide a desired degree of balance, and balance ports could be arranged in different ways to achieve a desired result. Further, different seal types could be used for the inner and outer sealing sleeves. Still further, more than two sealing sleeves may be provided with the appropriate surface areas and balance conduits provided to achieve the desired degree of balance to minimize unnecessary fluid pressure forces against the stem. Further, different trim types could be used such as, for example, needle, cage, or other desired choke trim. The present invention is thus not limited to the above-described exemplary embodiments, their operation, features or any of the details thereof. Accordingly, the scope of the invention and the appended claims is not limited to the embodiments or any of the details thereof described herein.

Additionally, it should be understood that certain features and subcombinations of the present invention are of utility and may be employed without reference to other features and subcombinations. This is contemplated and within the scope of the appended claims.

While the foregoing is directed to the preferred embodiment of the present invention, other and further embodiments of the invention may be devised without departing from the scope thereof, and the scope thereof is determined by the claims that follow.

What is claimed is:

1. A balanced control valve, comprising:
   a choke body having an upstream bore, a downstream bore a fluid flow chamber, and a valve seat useful in sealing the fluid flow chamber from the downstream bore;
   a bonnet connected to the choke body and adapted to receive a valve stem therethrough;
   a valve stem disposed through the bonnet and having a plurality of balanced sealing assemblies operably connected thereto, wherein the plurality of balanced sealing assemblies comprises an inner sealing assembly and an outer sealing assembly; and
   a first balance chamber, wherein the inner sealing assembly includes at least one balance conduit capable of communicating fluid between the downstream bore and the first balance chamber.

2. The balanced control valve of claim 1, wherein the inner sealing assembly includes an inner sealing sleeve with a sealing member for sealing engagement with an inner sealing surface of the valve seat of the choke body.

3. The balanced control valve of claim 2, wherein the sealing member of the inner sealing sleeve is a non-resilient sealing surface.

4. The balanced control valve of claim 3, wherein the non-resilient sealing surface is a carbide tip.

5. The balanced control valve of claim 1, further including a second balance chamber, wherein the outer sealing assembly includes at least one balance conduit capable of communicating fluid between the downstream bore and the second balance chamber.

6. The balanced control valve of claim 5, wherein the outer sealing assembly includes an outer sealing sleeve with a sealing member for sealing engagement with an outer sealing surface of the valve seat of the choke body.

7. The balanced control valve of claim 6, wherein the sealing member of the outer sealing sleeve is a resilient seal ring.

8. The balanced control valve of claim 7, wherein the resilient seal ring is an o-ring.

9. A balanced pressure control valve, comprising:
   a plurality of sealing assemblies in a single valve trim, wherein each of the plurality of sealing assemblies is a balanced sealing assembly, and
   wherein the plurality of sealing assemblies comprises an outer sealing assembly having a sealing member capable of sealing engagement with a valve seat associated with the control valve, and an inner sealing assembly in sliding engagement with the outer sealing assembly, and having a sealing member capable of sealing engagement with the valve seat.

10. The control valve of claim 9, wherein the outer sealing assembly includes a fluid flow conduit capable of communicating fluid between first and second cavities, the first cavity disposed between the outer sealing assembly and a valve body associated with the control valve, and the second cavity disposed between the inner and outer sealing assemblies.

11. The control valve of claim 10, wherein the sealing member of the outer sealing assembly is at least partially constructed of resilient material.

12. The control valve of claim 11, wherein the sealing member of the inner sealing assembly is at least partially constructed of non-resilient material.

13. The control valve of claim 10, wherein the sealing member of the outer sealing assembly is a resilient sealing member and wherein the sealing member of the inner sealing assembly is a non-resilient sealing member.

14. The control valve of claim 9, wherein the plurality of sealing assemblies are movable between at least a first fully open position, a second partially engaged position, and a third fully engaged position.

15. The control valve of claim 14, wherein, in the fully open position, neither the inner sealing assembly nor the outer sealing assembly is sealingly engaged with the valve seat.

16. The control valve of claim 14, wherein in the second partially engaged position, the inner sealing assembly is sealingly engaged with the valve seat, and the outer sealing assembly is not sealing engaged with the valve seat.

17. The control valve of claim 14, wherein in the third fully engaged position, the inner and outer sealing assemblies are sealingly engaged with the valve seat.

18. The control valve of claim 17, further including a backup seal member engageable between the valve seat and at least one of the inner and outer sealing assemblies.

19. A control valve comprising a plurality of sealing assemblies in a single choke trim, wherein each of the plurality of sealing assemblies is a balanced sealing assembly, the plurality of sealing assemblies comprising:
   an outer sealing assembly having a sealing member adapted for sealing engagement with an outer sealing surface of a valve seat associated with the control valve, and also having a balance conduit therethrough for communicating downstream fluid pressure to a balance chamber associated with the outer sealing assembly; and
   an inner sealing assembly in sliding engagement with the outer sealing assembly, and having a sealing member adapted for sealing engagement with an inner sealing surface of the valve seat, and also having a balance conduit therethrough for communicating downstream fluid pressure to a balance chamber associated with the inner sealing assembly.

20. The control valve of claim 19, wherein the outer sealing assembly includes a fluid flow conduit therethrough for communicating fluid pressure from a fluid flow chamber within the control valve to a chamber within the outer sealing assembly associated with the inner sealing assembly.

21. The control valve of claim 20, wherein the sealing member of the outer sealing assembly is a resilient sealing member.

22. The control valve of claim 20, wherein the sealing member of the inner sealing assembly is a non-resilient sealing member.

23. The control valve of claim 20, wherein the sealing member of the outer sealing assembly is a resilient sealing member and wherein the sealing member of the inner sealing assembly is a non-resilient sealing member.

24. The control valve of claim 19, wherein the plurality of sealing assemblies are selectively reciprocated between a first, fully open position; a second, initially engaged position; and a third, fully engaged position.

25. The control valve of claim 24, wherein, in the filly open position, neither the inner sealing assembly nor the outer sealing assembly is sealingly engaged with the valve seat.

26. The control valve of claim 25, wherein, in the initially engaged position, the inner sealing assembly is sealingly engaged with the valve seat but the outer sealing assembly is not sealing engaged with the valve seat.

27. The control valve of claim 25, wherein, in the fully engaged position, the inner and outer sealing assemblies are sealingly engaged with the valve seat.

28. The control valve of claim 27, wherein the valve seat includes a backup resilient soft seal member provided on the outer sealing surface of the valve seat.

29. A seal arrangement for a valve, the valve capable of being disposed between first and second fluid flow conduits, the valve and first fluid flow conduit associated with a flow control orifice, the valve having a valve body and a valve closure assembly, the valve closure assembly capable of varying the quantity of fluid flowing through the valve between the first and second fluid flow conduits, the seal arrangement comprising:

first and second annular seals disposed upon the valve closure assembly and engageable around the flow control orifice;

said first annular seal being constructed at least partially of substantially rigid, wear resistant, non-elastomeric material; and said second annular seal disposed between said first annular seal and the valve body and constructed at least partially of elastomeric material.

30. The seal arrangement of claim 29 wherein the valve is a control valve.

31. The seal arrangement of claim 30 wherein said second annular seal is capable of providing a substantially absolute seal around the flow control orifice.

32. The seal arrangement of claim 31 wherein the control valve is a choke valve.

33. The seal arrangement of claim 31 wherein said second annular seal is at least partially isolated from the primary fluid flow path between the first and second fluid flow conduits.

34. The seal arrangement of claim 31 further including a third annular seal engageable with the valve closure assembly and engageable around the flow control orifice.

35. The seal arrangement of claim 31 wherein the valve is balanced.

36. The seal arrangement of claim 29 wherein the valve is a pressure-balanced linear motion type valve.

37. The seal arrangement of claim 29 wherein the valve is non-balanced.

38. An apparatus for enabling a valve to be balanced, the valve having a valve body, the valve further having first and second plugs in a single valve trim, the first and second plugs each having first and second upper surfaces and being capable of being reciprocated within the valve body, the valve connectable between first and second fluid flow conduits, the apparatus comprising:

a first annular chamber disposed within the valve body adjacent to the first upper surface of the first plug;

a second armular chamber disposed within the valve body adjacent to the second upper surface of the first plug and in fluid communication with the second fluid flow conduit;

a cavity disposed within the valve body between the first plug and the first upper surface of the second plug;

a third annular chamber disposed within the valve body between the first plug and the second upper surface of the second plug;

the second plug having at least one passageway capable of communicating fluid from at least the first fluid flow conduit to said third annular chamber;

the first plug having at least one passage capable of communicating fluid from said third annular chamber to said first annular chamber; and the first plug having at least one other passage capable of communicating fluid from said second annular chamber to said cavity.

39. The apparatus of claim 38 wherein the valve is a control valve.

40. The apparatus of claim 38 wherein the first fluid flow conduit includes an orifice, further comprising first and second seals engageable around the orifice of the first fluid flow conduit, the first seal being associated with the first plug and constructed substantially of elastomeric material, and the second seal being associated with the second plug and constructed substantially of rigid non-elastomeric material.

41. The apparatus of claim 40 wherein the valve is a choke valve.

* * * * *